United States Patent [19]

Okamura et al.

[11] Patent Number: 4,636,434
[45] Date of Patent: Jan. 13, 1987

[54] CERAMIC COMPOSITE ARTICLE

[75] Inventors: Hisanori Okamura, Ibaraki; Hirosi Akiyama, Hitachi; Mutuo Kamoshita, Katsuta; Kunio Miyazaki, Hitachi, all of Japan

[73] Assignee: Hitachi, Ltd., Tokyo, Japan

[21] Appl. No.: 679,534

[22] Filed: Dec. 7, 1984

[30] Foreign Application Priority Data

Dec. 9, 1983 [JP] Japan ................. 58-231392

[51] Int. Cl.⁴ .............. B32B 9/00; C09J 1/00; F02C 1/00
[52] U.S. Cl. .................... 428/328; 428/332; 428/408; 428/414; 428/451; 428/480; 428/522; 428/698; 60/753; 156/330
[58] Field of Search .............. 428/408, 698, 414, 332, 428/522, 480, 451, 328

[56] References Cited

U.S. PATENT DOCUMENTS 3,911,188 10/1975 Torti, Jr. et al. .................... 428/698
4,055,451 10/1977 Cockbain et al. .................... 428/698
4,447,283 5/1984 Ebata et al. ......................... 428/698

FOREIGN PATENT DOCUMENTS

EP0134769 3/1985 European Pat. Off. ............ 428/698

Primary Examiner—P. C. Ives
Attorney, Agent, or Firm—Antonelli, Terry & Wands

[57] ABSTRACT

A carbon film is formed on a ceramic element, or a metal film is formed on the carbon film, and subsequently the ceramic element is bonded to another ceramic or metal element, thereby forming a composite article. The composite article has a high bonding strength and is hardly fractured at joint. Ceramic articles having a surface coating of a hard carbon film or a hard carbon film containing metal grains can also be formed by this process.

37 Claims, 4 Drawing Figures

F I G. 3
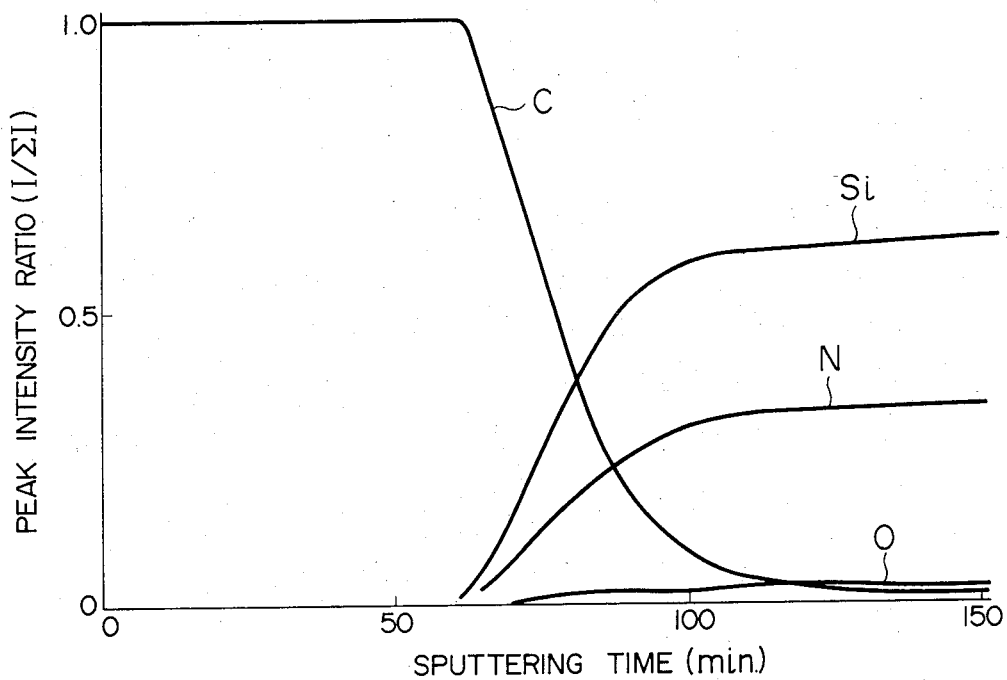

CERAMIC COMPOSITE ARTICLE

BACKGROUND OF THE INVENTION

1. Field of the Invention

This invention relates to a novel ceramic composite article and a process for producing the same.

The ceramic composite article of this invention is suitable for used as a turbocharger for automobiles, electrodes of a secondary battery, constitutive materials for gas sensors and the like.

2. DESCRIPTION OF THE PRIOR ART

In recent years, the field for application of ceramics has been enlarged, and ceramics are used in various fields. However, ceramics are rarely used alone and are used in the form of a composite in combination with other materials. The use in this form further enlarges the field for application. If ceramics can easily be made into a composite with other materials, new functions and characteristics can be brought about.

As conventional methods for joining a ceramic to another ceramic, the following methods are known.

(i) A method comprising inserting silicon carbide powder between ceramic surfaces to be joined, and then carrying out an isostatic press treatment at a temperature of 1,600° to 2,200° C., is disclosed in Japanese Patent Kokai (Laid-Open) No. 84185/83. In this method, the joining temperature is high, and the dimensions and shapes of materials to be joined are limited because hot isostatic press is employed.

(ii) A method comprising applying a paste prepared from powders of CuS, $LaCrO_3$ and $SiO_2$ by use of an organic solvent between ceramics and then subjecting the paste to reaction with heating at 1,000° to 1,200° C., is disclosed in Japanese Patent Kokai (Laid-Open) No. 75976/80. This method is poor in reliability, because the mixing ratio of the powder changes depending on the kind of ceramics.

(iii) A method comprising joining a silicon nitride containing ceramics by inserting a coating layer of oxide, nitride or carbide of metal between the ceramic surfaces to be joined, is disclosed in Japanese Patent Kokai (Laid-Open) Nos. 88184/83, 93402/74, 130865/80 and 79876/83. However, none of these methods yield a sufficient joint to the metallized layer to ceramics since a metal is directly bonded to the ceramics.

On the other hand, as conventional methods for joining a ceramic to a metal, there are generally known methods which comprise conducting metallizing (W, W-Mo, Mo-Mn) on a ceramic surface and then brazing the metallizing layer to the metal.

With regard to a method for forming the metallizing layer, a description is given in Japanese Patent Kokai (Laid-Open) Nos. 113683/80 and 96784/81. However, all of these joining methods comprises direct joining of a metal to a ceramic and hence do not permit sufficient joining of the metallizing layer itself to the ceramic.

SUMMARY OF THE INVENTION

OBJECTS OF THE INVENTION

An object of this invention is to provide a composite article comprising ceramic elements joined together which has a high tightness of joining, and a process for producing the same.

Another object of this invention is to provide a product comprising a ceramic element and a metal element which has a high tightness of joining, and a process for producing the same.

STATEMENT OF THE INVENTION

[I] Composite article comprising ceramic elements and a process for producing the same:

This invention consists in a ceramic composite article characterized in that ceramic elements are joined through diffusion with carbon.

For the ceramic elements, materials having any compositions can be used, and either ceramic elements of the same kind or of a different kind can be joined together. There can be used ceramic materials composed of at least one member selected from the group consisting of oxides, nitrides, carbides, silicides, borides.

The oxides include those comprising a main constituent such as $Al_2O_3$, BeO, $ZrO_2$, CaO, $SiO_2$, MgO, $ThO_2$, $TiO_2$ and mullite ($Al_2O_3 \cdot SiO_2$).

The nitrides include those comprising a main constituent such as $Si_3N_4$, AlN, BN, $Be_3N_2$, ZrN, NbN, VN and TiN.

The carbides include those comprising a main constituent such as SiC, $B_4C$, TiC, WC, TaC, NbC, HfC, ZrC and VC.

The silicides include $TiSi_2$, $ZrSi_2$, $HfSi_2$, $VSi_2$, $NbSi_2$, $TaSi_2$, $CrSi_2$, $MoSi_2$, $WSi_2$, etc. The borides include $TiB_2$, $ZrB_2$, $HfB_2$, $VB_2$, $NbB_2$, $TaB_2$, $CrB_2$, $MoB_2$, $WB_2$, etc.

In this invention, a part of or the whole of carbon inserted between the surfaces to be joined diffuses and penetrates into the ceramic materials, so that the two materials are joined with strong adhesion. With the ceramic composite article of this invention, there are the following two cases: a carbon film inserted between the ceramic elements diffuses and penetrates into both the ceramic elements, and the ceramic materials are joined through diffusion via the carbon film itself; or alternatively the whole carbon film penetrates into the ceramic elements, and the ceramic elements are directly joined together. The carbon film inserted between the surfaces to be joined of the ceramic elements is hard and has a high strength, and its electric resistivity at room temperature is preferably 10 $\Omega \cdot cm$ or less.

The carbon film inserted between the surfaces to be joined of the ceramic elements can be obtained by applying a specific organic substance to the ceramic element surfaces and then heating the organic substance in a nonoxidizing atmosphere. Further, it can be obtained also by decomposing an organic substance gas at a high temperature and depositing the decomposition product on the ceramic element surfaces. The thickness of the carbon film is preferably 10 $\mu m$ or less, particularly preferably 3 $\mu m$ or less. The minimum thickness of the carbon film is preferably 0.1 $\mu m$.

Organic substances can broadly be classified into the following (a) to (d) according to the state of carbon produced by decomposition by heating. The employment of the organic substances in (c) and (d) among them permits formation of the hard and adhesive carbon film of this invention. Therefore, it is preferable to join a ceramic material to a ceramic or metallic material via the carbon film formed of the organic substance in (c) and (d).

Employment of the organic substances in (d) is particularly preferred. When the organic substances in (c) and (d) are used, the tensile strength of the carbonized carbon film is preferably 10 $kg/mm^2$ or more, particularly preferably 20 $kg/mm^2$ or more at room temperature.

No matter which organic substance is used, the Vickers hardness of the carbon film of this invention is preferably 100 or more, particularly preferably 300 or more at room temperature.

(a) The whole organic compound spatters on thermal decomposition or evaporation. Therefore, no vitreous carbon film is formed at all on the ceramic surface.

Organic solvents such as ethyl alcohol, acetone and trichloroethylene belong to this group.

(b) A vitreous carbon film is partially formed but a major part of carbon film formed in the form of soot or coke. Resins such as ethyl cellulose, polyethylene, polystyrene, vaseline, polypropylene, polyacryl amide, polyacetal and polyisobutyl methacrylate belong to this group. These organic substances give no adhesive carbon film.

(c) Most of carbon film is formed in the form of vitreous carbon but part of carbon film in the form of soot or coke. This carbon film has adhesiveness to a certain extent and hence can join a ceramic material to a ceramic or metallic material. For example, phenol resins, polyimide resins, polycarbonate resins, polysulfone resins, polyvinylidine fluoride resins and cellulose acetate resins belong to this group.

(d) A part of or the whole of carbon in the organic compound remains as a hard, lustrous and vitreous carbon film on the ceramic surface, and the carbon film is tightly bonded to the ceramic surface. For example, thermosetting resins such as epoxy resins, polyester resins and polybutyl acrylate resins and thermoplastic resins such as vinyl acetate resins and polyvinyl chloride resins belong to this group. These resins are desired to be free, as completely as possible, from substances which remains in the form other than a carbon film when the resins are decomposed by heating in an inert atmosphere. From this point of view, it is preferable to use the epoxy resins and the polybutyl acrylate resins among the above-mentioned resins. Further, among the epoxy resins, bisphenol A type epoxy resins are particularly preferably used.

For forming a carbon film tightly bonded to the ceramic surface by decomposing the organic compound listed in (d) by heating, atmosphere during heating and heating temperature are important.

The atmosphere during heating is preferably an inert gas of high purity, for example, argon gas or helium gas. If any substance which undergoes a chemical reaction with carbon, for example, oxygen remains in the inert atmosphere, a part of the carbon remains as soot or coke, so that the highly adhesive, hard carbon film of this invention is not formed.

In the inert atmosphere, any heating source may be used. For instance, an electric furnace is the most simple means, though infrared rays, laser beams electron beams and the like can also be used.

Further, the objects of this invention can be achieved also by use of plasma CVD.

Also by heating the ceramics and the organic compound separately in the same atmosphere instead of applying the organic compound to the ceramic surface, a carbon film can be formed on the ceramic surface from a carbon-containing gas produced from the organic compound. Such a method also permits production of novel composite ceramics in which a carbon film is tightly bonded to the desired surface of ceramics.

On the other hand, composite ceramics having a strong joint interface can easily be obtained by applying a specific organic substance to the ceramic surface(s) of one or both of ceramic materials to be joined, sticking the two ceramics to each other via the organic substance, and then decomposing the organic compound by heating in a nonoxidizing atmosphere.

As the organic compound used in this case, those shown in above (c) and (d) are preferred, and in particular, epoxy resins, polybutyl acrylate and polyester resins are preferred. Employment of these organic substances yields a carbon film which is highly adhesive and hard as described above. Further, even when the organic substance in (b) which forms soot-like carbon is used, tight joining can be attained when direct joining of ceramic materials by diffusion of carbon is made attainable.

Although the joining of this invention can be conducted by means of the dead load without applying a pressure, tight joining can be attained by applying a pressure. The pressure applied is preferably 20 kg/mm$^2$ or less, particularly preferably 3 to 15 kg/mm$^2$.

The heating temperature during joining ranges preferably from a temperature at which the organic substance is almost carbonized to the softening point of the ceramic materials or lower, and temperatures of 800° to 2,000° C. are preferred. Temperatures of 1,000° to 1,500° C. are particularly preferred. The carbonization of the organic substance is completed at about 800° to 1,500° C., and above 1,500° C., graphitization occurs. At these temperatures, there is obtained a carbon film which has a high strength and is adhesive as described above.

[II] Ceramic composite material obtained by joining ceramic elements with a metal and a process for producing the same:

The second invention in the present application consists in a ceramic composite material characterized in that ceramic materials are joined with a metal via a hard carbon film formed on their surfaces to be joined. The ceramic materials used may be of the same kind or of a different kind. The carbon film is highly adhesive as described above, and a hard, vitreous carbon film is particularly preferred. This carbon film is formed in a condition diffused into ceramic serving as a base and hence is highly adhesive. The metal used in joining via a carbon film is preferably a solder material. The carbon film of this invention is good in wettability with a hard solder and soft solder.

Suitable solder materials include silver solders, copper solders, nickel solders, brass solders, iron solders, etc. The silver solders include alloys consisting of 40 to 60% by weight Ag, 20 to 35% by weight Cu and 15 to 30% by weight Zn; alloys consisting of these constituents and 15 to 25% by weight Cd; alloys consisting of 70 to 75% by weight Ag and 25 to 40% by weight Cu; alloys consisting of 80 to 90% by weight Ag and 10 to 20% by weight Mn; etc. The copper solders include pure copper, brass alloys containing 60% by weight or less Zn; alloys consisting of 4 to 10% by weight P, 4 to 7% by weight or 10 to 20% by weight Ag and balance of Cu; alloys consisting of 35 to 40% by weight Au and balance of Cu; copper alloys containing Mn; etc. The nickel solders include nickel alloys containing 15 to 25% by weight Mn; nickel alloys containing 10 to 20% by weight Cr, 2 to 5% by weight B and a total amount of 10% by weight or less Fe, Si and C; etc. As the solder material, those containing an element capable of forming a carbide are particularly high in wettability with solders and permit tight joining. Since the carbon film tends to peel off easily at the time of use in the atmosphere when it remains as it is in the joint, it is preferable to conduct joining so as not to leave the carbon film alone.

Further, the most preferable ceramic composite article in this invention are those obtained by forming a metal film on hard carbon films each formed on the surfaces to be joined of ceramic elements, and then joining the thus formed metal films, with a metal. The wettability with hard solders and soft solders can be further improved by thus forming metal films. As solder materials in this case, the above-mentioned silver solders, brass solders, nickel solders and the like can be used. The metal thin films can be formed by such a method as coating with a metal powder paste, vacuum evaporation, sputtering, plating or the like. Foils may also be used. Further, it is preferable that after the metal film are formed by such a method, heating is conducted in a nonoxidizing atmosphere to react the metal films with the carbon films.

In order to form a metal film tightly on the ceramic surface with a carbon film formed on the ceramic surfaces between, it is preferable to use, as a material for the metal film, a metal or an alloy which reacts with the carbon film to form a carbide when heated to the joining temperature. It is particularly preferable to use Cr, Ni, Mn, Fe, V, Ti, a nickel solder, an alloy solder of copper and manganese, an iron solder or the like.

[III] Ceramic composite articles obtained by joining a ceramic element to a metal element and a process for producing the same:

The third invention in the present invention consists in a ceramic composite article comprising a ceramic element and a metal element joined together, characterized in that the above-mentioned ceramic and metal elements are joined with a metal via a hard carbon film formed on the ceramic surface. Formation of the hard carbon film and the kind of solder material are the same as in the case described previously.

Further, this invention consists in a ceramic composite article comprising a metal film formed on the aforesaid carbon film on a ceramic element and a metal element joined thereto with a metal. A method for forming the metal film on the carbon film is the same as in [II]. However, it is preferable to form a strong metallizing layer by a method comprising heating the metal film to 500° C. or higher in an inert gas or in vacuo after formation of the metal film. As a material for the metal film, Cr, Mn, Ni, Fe or alloys containing these elements are preferred.

[IV] The next invention consists in a ceramic composite article characterized by having a hard carbon film on the surface of a ceramic material. The carbon film according to said invention is preferably a vitreous carbon film. This carbon film is preferably one which has a larger coefficient of friction than that of the ceramic material, and is not peeled off and hardly injured even by rubbing with a ferrous metal (Vickers hardness: HV100). The material in which this carbon film is formed is suitable as a material for sliding parts.

[V] The next invention consists in a ceramic composite article characterized by having a hard carbon film containing metal or ceramic grains on the surface of a ceramic material. The ceramic material surface can be made rough by forming the metal or ceramic grains, so that the subsequent tight joining by brazing or the like becomes possible.

As the metal grains, metals or solder alloys which form a carbide as described above are preferred. As the ceramic grains, the various ceramics described above can be used.

[VI] The next invention consists in a ceramic composite article characterized in that a hard carbon film is formed on the whole surface of a ceramic material. It utilizes the carbon film as a protective film for the ceramic material. Among ceramic articles, some graphite articles are soft and tend to go to pieces, and such graphite articles are protected by forming a hard carbon film on their whole surface.

All the carbon films formed in the ceramic composite materials of this invention explained in [I] to [VI] above can be removed by heating to a high temperature in the atmosphere. Therefore, it is also easy to separate the materials joined to each other. One example of application of the ceramic composite material of this invention is a turbocharger for automobiles. The turbocharger in this case preferably has the following structure. It has a pair of blades provided at both the ends of a shaft, one of which is made of a ceramic and the other of a metal, the two blades being joined by the shaft, and the metal is joined to the ceramic with a metal via a carbon film formed on the surface to be joined of the ceramic. As the ceramic used in this turbocharger, silicon nitride and silicon carbide sintered bodies are preferred. As the metal, it is preferable to use a carbon steel. For joining ceramics to a metal, it is preferable to use a Cu-Mn alloy, a Ni-Cr alloy or a Ni-Mn alloy.

In addition, the composite material of this invention can be used in electrodes for secondary batteries. As the ceramic in this case, alumina is suitable, and as the metal, stainless steels are suitable. For the joining with a metal, it is preferable to use the above-mentioned solder materials.

BRIEF DESCRIPTION OF THE DRAWINGS

FIG. 3 is a graph showing the results of Auger analysis of a carbon film formed on the surface of the ceramic composite article of this invention.

EXAMPLE 1

Figure 1:
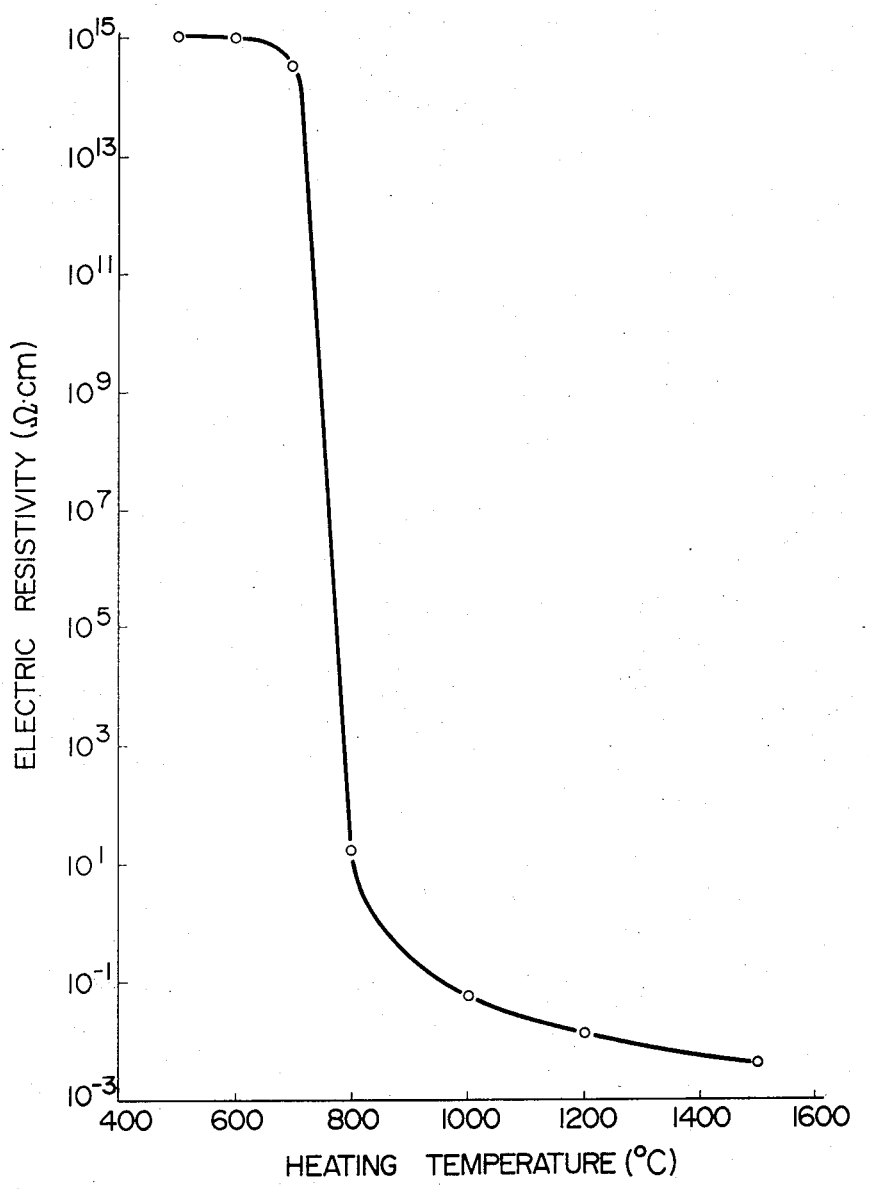
FIG. 1 is a graph showing the relationship between heating temperature for decomposition of the organic substance and the electric resistivity of the carbon film obtained.

FIG. 1 is a graph showing the relationship between heating temperature and the electric resistivity of a carbon film formed on a ceramic surface, in the case of applying a commercially available bisphenol type epoxy resin having an epoxy equivalent of 183 to 193 and a molecular weight of 330 (trade name: Epikote 815) to the surface of an $Si_3N_4$ ceramic sintered compact, followed by heating the epoxy resin in an Ar atmosphere (Ar flow rate: 8 liters/min.). The epoxy resin was first outgassed by heating to 350° to 400° C. at a heating rate of 100° C./min. and maintaining it at this temperature for 3 minutes. Thereafter, the epoxy resin was heated to a predetermined temperature at a heating rate of 200° C./min., maintained at this temperature for 3 minutes, and then allowed to cool spontaneously. As shown in FIG. 1, when the epoxy resin is heated to a temperature of 800° C. or higher, the electric resistivity lowers rapidly and an electrically conductive, vitreous carbon film is formed. The electric resistivity of this carbon film lowers with the rise of heating temperature and approaches the resistivity of crystalline graphite at a heating temperature of about 1,500° C.

The thickness of this carbon film was measured to be about 1 μm. The thickness of carbon film can arbitrarily be changed by a method for applying the epoxy resin to the ceramic surface. Below 700° C., the epoxy resin remains as it is without progress of carbonization, so that the electric resistivity increases. Accordingly, it is necessary to carbonize the epoxy resin by heating at a temperature of 700° C. or higher to penetrate carbon into the ceramic sintered compact.

At a heating temperature in an inert atmosphere of below 800° to 1,500° C., the carbon film obtained is composed mainly of amorphous vitreous carbon and partly of crystallized graphite. It was found from various analysis results that at a heating temperature of 1,500° C. or higher, the amount of graphite increased in addition to amorphous carbon. This is confirmed also by the electric resistivity in FIG. 1.

As described above, either a carbon film comprising amorphous carbon as its main constituent or a carbon film comprising crystalline graphite as its main constituent can optionally be formed by changing the heating temperature.

The carbon film formed on the ceramic surface by the method described above is chemically and tightly bonded to the ceramic surface and cannot be removed from the ceramic surface by a method other than mechanical methods such as polishing.

The carbon film formed on the ceramic surface was so hard that it was not injured at all even when scratched with a stainless steel needle having a Vickers hardness of 150 at room temperature.

It is apparent that the carbon film of the present example is formed by heating at 800° C. or higher, and said carbon film is very hard and highly adhesive as described above. Further, said carbon film can be made into a film heightened in degree of graphitization and in strength by heating it at a high temperature lower than the melting point of the ceramic material.

Example 2

A commercially available polybutyl acrylate resin was applied to the surface of an $Al_2O_3$ ceramic sintered compact having a thickness of 5 mm, longitudinal and lateral dimensions of 40 mm each and a surface roughness of 10 μm, and then heated to 1,200° C. in the same manner as in Example 1. As a result, a mainly amorphous, vitreous carbon film of about 0.5 μm in thickness was formed. This film had an electric resistivity of about $2 \times 10^{-2}$ Ω.cm at room temperature, and was very hard and highly adhesive as in Example 1.

EXAMPLE 3

Figure 2:
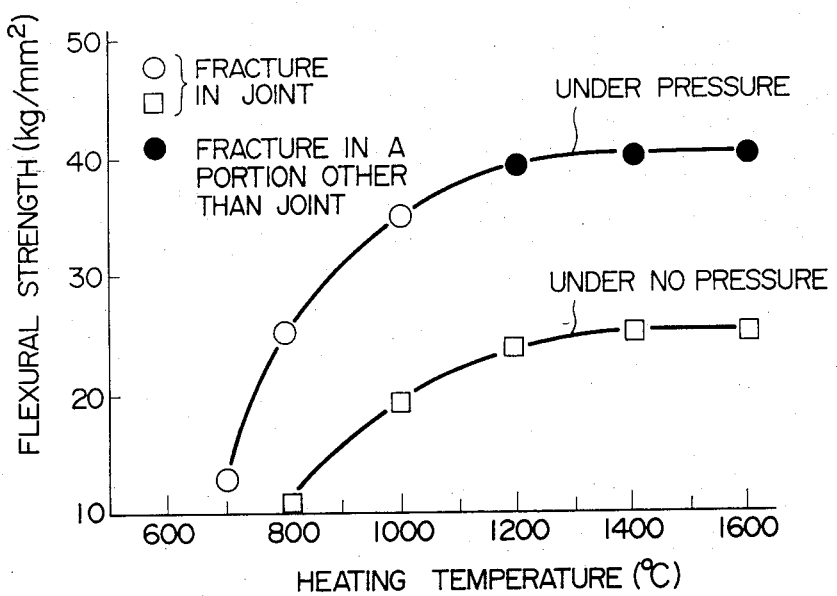
FIG. 2 is a graph showing the relationship between temperature at joining of ceramic materials and flexural strength.

FIG. 2 is a graph showing the relationship between heating temperature and flexural strength of joint, in the case of applying a commercially available polybutyl acrylate resin to the surface of one of electrically insulating SiC ceramic sintered compacts containing 2% by weight BeO and having longitudinal and lateral dimensions of 20 mm each and a thickness of 30 mm, followed by heating the resin in an argon atmosphere to join the compacts. The flexure test was carried out by measuring the strength at a distance between two points of 40 mm. In FIG. 2 are shown flexural strength under a pressure of 10 kg/mm² applied between the surfaces to be joined and flexural strength under no pressure. In both the cases, flexural strength reached a maximum at a heating temperature above 1,200° C. Among test pieces to which pressure was applied, those in which joining was made at a temperature above 1,200° C. were fractured at a portion other than the joint. The carbon film was formed so as to have a thickness of about 1 μm. The surface roughness of the ceramic was about 1 μm.

When a pressure is applied between the surfaces to be joined, at the time of joining, it is preferable to start application of pressure at a heating temperature of 400° C. or higher. The reason for this is that since various gases are evolved from the organic compound at a heating temperature below 400° C., undesirable defects such as blowholes tend to remain on the surfaces to be joined when the gases remain on these surfaces.

As described above, it was confirmed that according to this invention, ceramic can tightly be joined to ceramic with a carbon film formed by applying a carbon-containing organic compound to one or both of the surfaces to be joined of the ceramic materials, and then decomposing the organic compound by heating in an inert atmosphere.

As a result of elementary analysis of the joint, no peak due to carbon was detected in the joint interface. This is considered to be because carbon produced by the thermal decomposition diffused into the ceramics materials. Even when the composite obtained was heated in the atmosphere, the two materials were not peeled off from each other and the strength was substantially the same as before the heating.

EXAMPLE 4

A commercially available liquid bisphenol A type epoxy resin having an epoxy equivalent of 186 and a molecular weight of 330 was uniformly applied to the surface of an $Si_3N_4$ ceramic sintered compact having a diameter of 30 mm, a length of 100 mm and a surface roughness of 10 μm, and then heated to 1,200° C. in an argon atmosphere in the same manner as in Example 1. As a result, a hard carbon film of about 1 μm in thickness was formed with tight bonding on the surface of the $Si_3N_4$ sintered compact. This carbon film was composed mainly of amorphous carbon and partly of crystalline graphite. FIG. 3 is the Auger analysis results of the carbon film obtained. From the characteristics shown in FIG. 3, carbon (c) is considered to be diffused into the $Si_3N_4$ sintered compact and formed into a film adhered in the sintered compact.

The coefficient of friction of the carbon film formed was measured to find that it was very small as compared with that of the $Si_3N_4$ ceramic sintered compact. As a result of wear test, the wear resistance of the sintered compact having the carbon film was about 3 times that of the sintered compact having no carbon film.

The carbon film of the present example is excellent in corrosion resistance to chemicals such as sodium carbonate, orthophosphoric acid, concentrated sulfuric acid, concentrated hydrochloric acid, concentrated nitric acid and the like, and hence is very effective as a protective film for ceramic compacts.

EXAMPLE 5

An electrically insulating SiC ceramic sintered compact containing 2% by weight BeO and having a specific resistance of $10^{13}$ Ω.cm and another $Si_3N_4$ ceramic sintered compact were joined together by the process of this invention. Both the sintered compacts had longitudinal and lateral dimentions of 10 mm each, a length of 50 mm and a surface roughness of the surface to be joined of 10 μm. A commercially available bisphenol type epoxy resin having an epoxy equivalent of 190 and a molecular weight of 380 was applied to the surfaces to be joined of both the materials and then heated in an Ar atmosphere in the same manner as in Example 1. The two sintered compacts were separated until the heating temperature reached 400° C., and the epoxy resin was outgassed, after which a pressure of 10 kg/mm² was applied between the two materials, and the epoxy resin was heated to 1,300° C. at the same rate as in Example 1 and maintained at this temperature for about 1 minute to join the two materials.

The three ceramic composite materials obtained by this process were subjected to a flexure test, and as a result, all of them had a flexural strength of 25 kg/mm² or more. In all of them, fracture took place in a portion other than the joint.

EXAMPLE 6

Two Si$_3$N$_4$ ceramic materials having a diameter of 10 mm and a length of 100 mm were used. A commercially available polyester resin was applied to the surface to be joined of one material, heated up to 1,500° C. in an Ar atmosphere in the same manner as in Example 1, and then allowed to cool spontaneously. The materials to be joined were separated until the heating temperature reached 350° C., and after the polyester resin was outgassed, a pressure of 5 kg/mm² was applied between the materials to be joined. The thus obtained ceramic composite material had a flexural strength of 30 kg/mm² at room temperature and was fractured in a portion other than the joint.

EXAMPLE 7

A bisphenol A type epoxy resin having an epoxy equivalent of 183 to 193 and a molecular weight of 330 was applied to the surface of ceramic sintered compacts of each of Si$_3$N$_4$, SiC and Al$_2$O$_3$, and then heated at 800° C. in an Ar atmosphere in the same manner as in Example 1 to form a hard, vitreous carbon film on the surface of each sintered compact. Next, each of the solder materials shown in the table was placed on said surface, and a wettability test on the solder materials was carried out. The SiC sintered compact was the same as in Example 5. The table shows the results of wettability test on the various solder materials.

The compositions of solder materials in the table are expressed in terms of % by weight. In the wettability test, heating was conducted in an argon atmosphere. Temperatures at the wettability test are shown in the parentheses in the table. The roughness of surface of each ceramic was about 1 μm, and the SiC sintered compact was the same as in Example 5.

shown in the table was poor (mark Δ) in all the cases. However, according to the present invention, the wettability of ceramic with solder material can greatly be improved as shown in the table.

In the case of Si$_3$N$_4$ ceramics, wettability is particularly good (mark   ) when the solder material contains Cr.

As a result of elementary analysis of a joint between Si$_3$N$_4$ ceramic and Ni-19Cr-11P, a peak due to Cr was observed in the joint interface. From this fact, it is reasonably supposed that a chromium carbide layer is formed in the joint interface in the case of Si$_3$N$_4$ ceramic.

That is to say, it is considered that the carbon film on the ceramic surface promotes the reaction of Si of Si$_3$N$_4$ with Cr to form a transitional layer of chromium silicide in the joint interface. However, no peak due to carbon was observed in the joint interface after the joining, and it is supposed that carbon diffused into the metal or the ceramics in the joining process. Accordingly, even when a composite ceramic product obtained by the process of this invention is heated in the atmosphere, no oxidation of carbon occurs and no adverse effect is brought about.

SiC ceramic and Al$_2$O$_3$ ceramic are both very good (mark   ) in wettability when the solder material contains Mn. From this fact, it is considered that in the case of SiC or Al$_2$O$_3$ ceramic, the carbon film on the ceramic surface promotes the reaction of Si of SiC ceramic or SiO$_2$ contained in Al$_2$O$_3$ ceramic with Mn of the solder material to form a reaction layer of manganese silicide, yielding a strong joint interface.

EXAMPLE 8

A commercially available bisphenol A type epoxy resin having an epoxy equivalent of 290 and a molecular weight of 710 was applied to the surface of an Si$_3$N$_4$ ceramic sintered compact having a thickness of 5 mm, longitudinal and lateral dimentions of 30 mm each and a surface roughness of 5 μm, heated at a maximum temperature of 1,000° C. for 1 minute, and then allowed to stand to be subjected to spontaneous cooling.

By this method, a vitreous carbon film of about 1 μm in thickness was formed on the surface of the Si$_3$N$_4$ ceramic sintered compact. Subsequently, Ni solder powder according to JIS BNi-7 (Ni-19 (% by weight) Cr-11 (% by weight) P alloy) was applied to the surface of carbon film of the Si$_3$N$_4$ ceramic sintered compact, and Ni foil of 50 μm in thickness was placed thereon. The resulting assembly was heated to 1,050° C., the melting temperature of the solder material, in an argon atmosphere and then allowed to cool spontaneously. The duration of maintenance of the assembly at 1,050° C. was 1 minute and a load of 300 g was applied so that the Ni foil might not slide during joining.

TABLE

| Ceramic | Solder material (% by weight) | | | | | |
|---|---|---|---|---|---|---|
| | Ni—19Cr—11P (1,000° C.) | Ni—60Mn (1,050° C.) | Ni—60Mn—2Cr (1,100° C.) | 71Ni—19Cr—10Si (1,200° C.) | Cu—38Mn (880° C.) | 38N—40Cr—30Ge |
| Si$_3$N$_4$ | | o | o | | o | |
| SiC | | | | o | | |
| Al$_2$O$_3$ | Δ | o | Δ | | | Δ |

: Very good wettability (having an area 5 times greater than the original area of the solder material)
o: Good wettability (having an area about 2 times greater than the original area of the solder material)
Δ: Poor wettability (having substantially the same area as the original area of the solder material)

When the carbon film of this invention was not formed on the ceramic surface, wettability measured for the combinations of ceramics and solder materials The three composites composed of Si₃N₄ ceramic sintered compact and Ni foil obtained by this process were subjected to a peeling-off test to find that all of them had a peeling resistance of 20 kg/mm or more.

EXAMPLE

A carbon film was formed on the surface of an $Al_2O_3$ ceramic sintered compact having a thickness of 2 mm, longitudinal and lateral dimensions of 20 mm each and a surface roughness of 5 μm by the same method as in Example 1. Alloy foil of 50 μm in thickness consisting of Cu and 38% by weight Mn was placed on the surface of carbon film on the surface of $Al_2O_3$ sintered compact, and Cu foil of 100 μm in thickness was further placed thereon. The resulting assembly was heated to 900° C., which was a little higher than the melting point of the solder material foil, for 1 minute in an argon atmosphere.

The five composites composed of the thus obtained $Al_2O_3$ ceramic sintered compact and Cu foil were subjected to a peeling-off test to find that all of them had a peeling resistance of 20 kg/mm or more and were fractured from the Cu foil.

EXAMPLE 10

A commercially available bisphenol A type epoxy resin having an epoxy equivalent of 186 and a molecular weight of 330 was applied to the surface of an $Si_3N_4$ sintered compact having a thickness of 1 mm, longitudinal and lateral dimensions of 50 mm and a surface roughness of 10 μm, and heated at a maximum temperature of 1,200° C. for 1 minute in an argon atmosphere in the same manner as in Example 1.

By this method, a hard carbon film of about 1 μm in thickness was formed. Subsequently, Cr was first evaporated onto the surface of carbon film of the $Si_3N_4$ ceramic sintered compact to a thickness of 5 μm by an evaporation method using electron beam heating, and Ni was evaporated onto the evaporated Cr to a thickness of about 5 μm. The thus treated carbon film was further heated in vacuo at 1,200° C. for 10 minutes and then allowed to cool spontaneously, whereby the $Si_3N_4$ surface was metallized. Cu foil of 50 μm in thickness was joined to the metallized $Si_3N_4$ surface with silver solder. As a result of a peeling-off test on the joint interface, the peeling resistance was 30 kg/mm or more and peeling-off was from the silver-brazed portion in all cases.

EXAMPLE 11

An $Si_3N_4$ ceramic sintered compact having a diameter of 15 mm and a length of 20 cm and graphite of the same shape were joined according to this invention. A commercially available bisphenol A type epoxy resin having an epoxy equivalent of 183 and a molecular weight of 330 was first applied to the respective surfaces to be joined of the above-mentioned two materials, heated to 400° C. in an argon atmosphere in the same manner as in Example 1, and then maintained at this temperature to outgas the resin sufficiently. Thereafter, a pressure of 5 kg/mm² was applied between the surfaces to be joined, and the resin was heated up to 1,500° C. at a heating rate of 300° C./min. and then allow to cool spontaneously.

As a result of measuring the flexural strength of the composite ceramic products obtained by this process, the flexural strength was about 5 kg/mm² and all the products were fractured in the graphite side other than the joint.

EXAMPLE 12

The same electrically insulating SiC ceramic sintered compact as in Example 3 having longitudinal and lateral dimensions of 10 mm each and a length of 30 mm and graphite of the same shape were joined by a method involving application of pressure, in the same manner as in Example 3. As a result of measuring the flexural strength of the thus obtained composite ceramic products, the flexural strength was 4 kg/mm² or more and all the products were fractured in the graphite side other than the joint.

EXAMPLE 13

Ni alloy solder powder containing 19% by weight Cr and 11% by weight P and having an average grain size of 30 μm was mixed with the same liquid epoxy resin as used in Example 1, in an amount of 10 g/cc of said resin. The resulting mixture was applied to the surface of an $Si_3N_4$ sintered compact and maintained at temperatures of 400° to 450° C. in an Ar atmosphere for 5 to 10 minutes. Subsequently, the mixture was heated at 1,000° C. for 1 minute. As a result, Ni alloy solder layer having a uniform thickness was formed on a carbon film on the $Si_3N_4$ sintered compact. Since the carbon film is formed on the ceramic surface before the melting of the solder and the carbon film itself is poor in wettability with the solder powder, the solder layer having no carbon film is formed.

EXAMPLE 14

Cu alloy powder having an average grain size of 30 μm was mixed with the same liquid epoxy resin as used in Example 1, in an amount of 10 g/cc of said resin, and the resulting mixture was applied to the surface of the same electrically insulating SiC sintered compact as used in Example 3. Thereafter, the mixture was maintained at temperatures of 400° to 450° C. for 5 to 10 minutes in an Ar atmosphere and then heated at 900° C. for 1 minute. As a result, Cu alloy solder layer having a uniform thickness was formed on a carbon film on the surface of the SiC sintered compact.

EXAMPLE 15

In the same manner as in Example 13, the same mixture of epoxy resin and Ni alloy solder powder as used in Example 13 was applied to the surface of an $Si_3N_4$ sintered compact and maintained at temperatures of 400° to 450° C. in an Ar atmosphere for 5 to 10 minutes. Thereafter, the mixture was heated at a temperature of 1,000° C. for 1 minute in contact with commercially available SUS 304 steel of JIS standard. As a result, the $Si_3N_4$ sintered compact and the SUS 304 steel were tightly joined.

EXAMPLE 16

Figure 4:
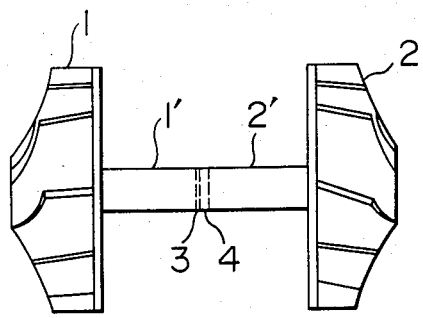
FIG. 4 is a perspective view of the turbocharger for automobiles of this invention.

A ceramic blade 1 having the shape shown in FIG. 4 was produced by using a sintered body consisting of silicon nitride containing 2% by weight each of magnesia and beryllia. A metal blade 2 having the shape shown in FIG. 4 was produced by using SCM alloy steel of JIS standard. A turbocharger for automobiles having the shape shown in FIG. 4 was produced by joining the ceramic blade 1 and the metal blade by the process of this invention. Epoxy resin was applied to the portion to be joined of a shaft 1' of the ceramic blade 1 in the same manner as in Example 1 and heated at 1,500° C. to form a vitreous carbon film 3 of about 1 μm in thickness.

Next, paste of solder alloy powder consisting of 71% by weight Ni, 19% by weight Cr and 10% by weight Si was inserted between the carbon film and a shaft 2' of the metal blade 2 and heated at a temperature of 1,200° C. in an argon atmosphere. As a result, it was confirmed that the ceramic blade and the metal blade were tightly joined by solder 4.

EXAMPLE 17

A turbocharger in which a metal blade 2 was brazed in the same manner as in Example 16 was produced by using a sintered body consisting of silicon carbide containing 2% by weight beryllia as a ceramic blade 1. In the present example, an alloy consisting of 60% by weight Mn and balance of Ni was used as a solder material. The brazing temperature was 1,050° C., and the heating was conducted in an Ar atmosphere. The ceramic blade and metal blade of the turbocharger obtained according to this invention were tightly joined.

As described above in detail, according to this invention, there can be obtained ceramic composite material composed of a product of joining ceramic materials or a product of joining a ceramic material and a metal material which products have a high tightness of joining.

What is claimed is:

1. A ceramic composite article which comprises ceramic elements joined together with carbon which has been diffused and penetrated into the ceramic elements from the decomposition of an organic substance applied to at least one joining surface of the ceramic elements, the organic substance being selected from the group consisting of phenol resin, Polyimide resin, polyvinylidine fluoride resin, cellulose acetate resin, epoxy resin, polyester resin, polybutyl acrylate resin, vinyl acetate resin and polyvinyl chloride resin, and the thickness of any carbon film at an interface between the joining surfaces is not more than 10 μm.

2. A ceramic composite article according to claim 1, wherein a hard carbon film is present on at least one joining surface of said ceramic elements.

3. A ceramic composite article according to claim 1, wherein said carbon is diffused into the joining surfaces of said ceramic elements.

4. A ceramic composite article according to claim 1, wherein the organic substance is a resin selected from the group consisting of epoxy resin, polybutyl acrylate resin and polyester resin.

5. A ceramic composite article which comprises ceramic elements joined together with a metal via hard carbon films each formed on joining surfaces of said ceramic elements wherein carbon from the carbon films has been diffused and penetrated into the ceramic elements from the decomposition of an organic substance applied to the joining surfaces of the ceramic elements, the organic substance being selected from the group consisting of phenol resin, polyimide resin, polyvinylidine fluoride resin, cellulose acetate resin, epoxy resin, polyester resin, polybutyl acrylate resin, vinyl acetate resin and polyvivyl chloride resin, and the thickness of a carbon film on the joining surfaces is not more that 10 μm.

6. A ceramic composite article according to claim 1, wherein the decomposition is performed at a temperature of at least 800° C.

7. A ceramic composite article according to claim 1, wherein the thickness of the carbon film is 0.1 to 10 μm.

8. A ceramic composite article according to claim 5, wherein said carbon film has an electric resistivity of 10 Ω.cm or less at room temperature.

9. A ceramic composite article according to claim 5, wherein said metal is a solder.

10. A ceramic composite article according to claim 5, wherein the organic substance is a resin selected from the group consisting of epoxy resin, polybutyl acrylate resin and polyester resin.

11. A ceramic composite article according to claim 5, wherein the decomposition is performed at a temperature of at least 800° C.

12. A ceramic composite article according to claim 5, wherein the thickness of the carbon film is 0.1 to 10 μm.

13. A ceramic composite article which comprises ceramic elements joined together via a solder between metal films located between hard carbon films, each carbon film being formed on joining surfaces of said ceramic elements wherein carbon from the carbon films has been diffused and penetrated into the ceramic elements from the decomposition of an organic substance applied to the joining surfaces of the ceramic elements, the organic substance being selected from the group consisting of phenol resin, polyimide resin, polyvinylidine fluoride resin, cellulose acetate resin, epoxy resin, polyester resin, polybutyl acrylate resin, vinyl acetate resin and polyvinyl chloride resin, and the thickness of a carbon film on the joining surfaces is not more than 10 μm.

14. A ceramic composite article according to claim 13, wherein said metal films and carbon are reacted to form a carbide on the surfaces of said metal films joined to said carbon films.

15. A ceramic composite article according to claim 13, wherein the organic substance is a resin selected from the group consisting of epoxy resin, polybutyl acrylate resin and polyester resin.

16. A ceramic composite article according to claim 13, wherein the decomposition is performed at a temperature of at least 800° C.

17. A ceramic composite article according to claim 13, wherein the thickness of the carbon film is 0.1 to 10 μm.

18. A ceramic composite article which comprises a ceramic element and a metal element joined together with a metal via a hard carbon film formed on a joining surface of said ceramic element wherein carbon from the carbon film has been diffused and penetrated into the ceramic element from the decomposition of an organic substance applied to the joining surface of the ceramic element, the organic substance being selected from the group consisting of phenol resin, polyimide resin, polyvinylidine fluoride resin, cellulose acetate resin, epoxy resin, polyester resin, polybutyl acrylate resin, vinyl acetate resin and polyvinyl chloride resin, and the thickness of any carbon film on the joining surface of the ceramic element is not more than 10 μm.

19. A ceramic composite article according to claim 18, wherein said carbon film has an electric resistivity of 10 Ω.cm at room temperature.

20. A ceramic composite article according to claim 18, wherein said metal is a solder.

21. A ceramic composite article according to claim 18, wherein the organic substance is a resin selected from the group consisting of epoxy resin, polybutyl acrylate resin and polyester resin.

22. A ceramic composite article according to claim 18, wherein the decomposition is performed at a temperature of at least 800° C.

23. A ceramic composite article according to claim 18, wherein the thickness of the carbon film is 0.1 to 10 µm.

24. A ceramic composite article which comprises ceramic elements joined with a hard carbon film containing metal grains wherein carbon from the carbon film has been diffused and penetrated into the ceramic elements from the decomposition of an organic substance containing metal grains applied to at least one joining surface of the ceramic elements, the organic substance being selected from the group consisting of phenol resin, polyimide resin, polyvinylidine fluoride resin, cellulose acetate resin, epoxy resin, polyester resin, polybutyl acrylate resin, vinyl acetate resin and polyvinyl chloride resin, and the thickness of a carbon film containing metal grains at an interface between joining surfaces is not more than 10 µm.

25. A ceramic composite article according to claim 24, wherein the organic substance is a resin selected from the group consisting of epoxy resin, polybutyl acrylate resin and polyester resin.

26. A ceramic composite article according to claim 24, wherein the decomposition is performed at a temperature of at least 800° C.

27. A ceramic composite article according to claim 24, wherein the thickness of the carbon film is 0.1 to 10 µm.

28. A ceramic composite article which comprises a ceramic element and a metal element joined with a hard carbon film containing metal grains wherein carbon from the hard carbon film containing metal grains has been diffused and penetrated into the ceramic element from the decomposition of an organic substance containing metal grains applied to a joining surface of the ceramic elements, the organic substance being selected from the group consisting of phenol resin, polyimide resin, polyvinylidine fluoride resin, cellulose acetate resin, epoxy resin, polyester resin, polybutyl acrylate resin, vinyl acetate resin and polyvinyl chloride resin, and the thickness of a carbon film on the joining surface is not more than 10 µm.

29. A ceramic composite article according to claim 28, wherein the organic substance is a resin selected from the group consisting of epoxy resin, polybutyl acrylate resin and polyester resin.

30. A ceramic composite article according to claim 28, wherein the decomposition is performed at a temperature of at least 800° C.

31. A ceramic composite article according to claim 28, wherein the thickness of the carbon film is 0.1 to 10 µm.

32. A ceramic composite article which comprises ceramic elements each having a hard carbon film formed on the surface thereof resulting from the decomposition of an organic substance applied to the surface of the ceramic elements, the organic substance being selected from the group consisting of phenol resin, polyimide resin, polyvinylidine fluoride resin, cellulose acetate resin, epoxy resin, polyester resin, polybutyl acrylate resin, vinyl acetate resin and polyvinyl chloride resin, wherein a portion of the carbon from the hard carbon film is diffused and penetrated into the ceramic elements.

33. A ceramic composite article according to claim 32, wherein the organic substance is a resin selected from the group consisting of epoxy resin, polybutyl acrylate resin and polyester resin.

34. A ceramic composite article according to claim 32, wherein the decomposition is performed at a temperature of at least 800° C.

35. A ceramic composite article which comprises ceramic elements each having a hard carbon film containing metal grains formed on the surface thereof resulting from the decomposition of an organic substance containing metal grains applied to the surface of the ceramic elements, the organic substance being selected from the group consisting of phenol resin, polyimide resin, polyvinylidine fluoride resin, cellulose acetate resin, epoxy resin, polyester resin, polybutyl acrylate resin, vinyl acetate resin and polyvinyl chloride resin, containing metal grains, wherein a portion of the carbon of the hard carbon film containing metal grains has been diffused and penetrated into the ceramic elements.

36. A ceramic composite article according to claim 35, wherein the organic substance is a resin selected from the group consisting of epoxy resin, polybutyl acrylate resin and polyester resin.

37. A ceramic composite article according to claim 35, wherein the decompostion is performed at a temperature of at least 800° C.

* * * * *